May 2, 1961 E. E. STEINBRECHER 2,982,859

LIGHT COMMUNICATION ALINEMENT SYSTEM

Filed Feb. 4, 1959 3 Sheets-Sheet 1

INVENTOR.
ERNST E. STEINBRECHER
BY Karl Huber
James E. Bryan
Alan C. Rose
ATTORNEYS

LIGHT COMMUNICATION ALINEMENT SYSTEM

Filed Feb. 4, 1959 3 Sheets-Sheet 2

INVENTOR.
ERNST E. STEINBRECHER
BY Karl Huber
James E. Bryan
Alan C. Rose
ATTORNEYS

LIGHT COMMUNICATION ALINEMENT SYSTEM

Filed Feb. 4, 1959 3 Sheets-Sheet 3

INVENTOR.
ERNST E. STEINBRECHER
BY Karl Huber
James E. Bryan
Alan C. Rose
ATTORNEYS United States Patent Office 2,982,859

Patented May 2, 1961

2,982,859

LIGHT COMMUNICATION ALINEMENT SYSTEM

Ernst E. Steinbrecher, Montclair, N.J., assignor to Engelhard Hanovia, Inc., a corporation of New Jersey Filed Feb. 4, 1959, Ser. No. 791,203

5 Claims. (Cl. 250—205)

This invention relates to two-way light communication systems and more particularly to arrangements for the automatic alinement of the directional component or components of such a system.

In point to point communications systems wire links may be impractical and, for a number of reasons, it may be desirable to avoid radio communications. These reasons include the necessity for maintaining radio silence in military situations, and the desire of civilians to avoid the regulations associated with radio broadcasting. Light communication systems have provided an excellent solution to this problem for many purposes. High powered arc lamps, which are now available, and electronic techniques for modulating these arc lamps at high frequencies have contributed in no small measure to the increasing interest in light communication systems. However, the high illumination levels necessary for distance communications in daylight hours means that the light beams, which are employed, subtend a relatively small angle. In order to maintain two-way communications under these conditions, particularly when the lamps are mounted on shipboard, a good tracking system must be employed to maintain proper orientation of the two lamps. Up to the present time, attempts have been made to orient the lamps entirely from one end of the communication system. The results obtained in this manner have been conspicuously unsuccessful, and considerable difficulty has been encountered in maintaining automatic alinement of the equipment at the two stations.

Accordingly, the principal object of the present invention is the improvement in automatic alinement of two-way light communication systems.

In accordance with the present invention, it has been discovered that a more positive control for light communication systems is provided by sensing the deviation from alinement at one station and applying the correction signals to reorient the lamp at the other station. In one specific embodiment of my invention, four co-ordinate photocells are spaced evenly around the communication channel sensing cell at each station of the system control. Signals of different frequencies are generated at each station and are transmitted from each station to the opposite station, error signals are developed by the photocells, and the signals returned to the originating station have a phase which indicates the necessary correction in orientation of the lamp associated with the source of the signals.

In accordance with a feature of my invention, a two-way light communication system includes a directional lamp at one station; and the other station includes a second lamp, light sensing apparatus for generating signals indicating the relative intensity of received light at different points with respect to the light sensing apparatus, and circuitry for modulating the second lamp in accordance with the generating signals. In addition, the first station includes apparatus for reorienting the directional lamp in accordance with the modulated signals transmitted by the second lamp.

In accordance with another feature of my invention, the system described in the preceding paragraph may include as part of the light sensing apparatus, a principal photocell for communication purposes and additional photocells located on opposite sides of the principal photocell. Furthermore, where both of the signal lamps are directional, duplicate orientation facilities may be provided.

Other objects, features and various advantages of the present invention will become apparent from a consideration of the following detailed description and from the drawing, in which.

Figures 1, 2, 3, 4:
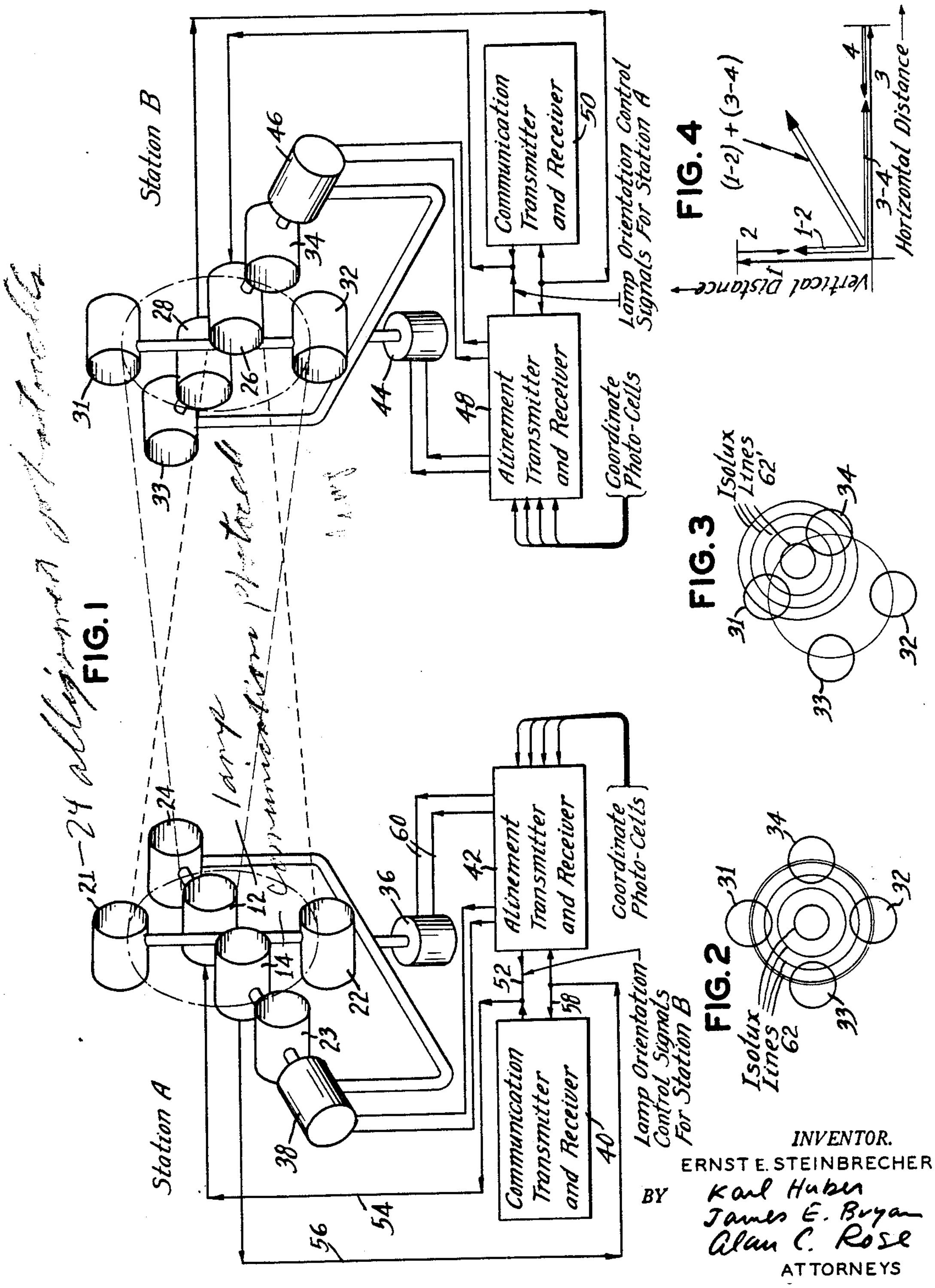
Figure 1 is a schematic diagram of a two-way light communication system in accordance with the present invention.
Figures 2, 3 and 4 are diagrams indicating a vector technique for sensing the beam position.

With reference to the drawings, Figure 1 shows a complete two-way light communication system in accordance with the present invention. In Figure 1, the lamp 12 and the photocell assembly 14 are employed for communication purposes. The four photocells 21 through 24 are employed to obtain alinement information for use in orienting the lamp 26 at station B of the system. The communication channel receiving photocell at station B is designated 28. The four alinement photocells 31 through 34 are equally spaced around the center assembly including the lamp 26 and the central photocell 28. The electrical equipment at station A includes the motor 36 for rotating the lamp 12 about a vertical axis and the motor 38 for tilting the lamp and photocell assembly. The terminal apparatus at station A also includes the communication transmitter and receiver 40 and the alinement transmitter and receiver 42. At station B, the motor 44 controls the rotation of the lamp and photocell assembly about a vertical axis, and the motor 46 controls the rotation of the assembly about a horizontal axis. At station B, the alinement transmitter and receiver 48 and the communication transmitter and receiver 50 are coupled to the motors and the photocell-lamp assembly.

In the operation of the circuit of Figure 1, a fixed frequency, which may be designated $f_2$, is generated in the alinement transmitter and receiver circuit 42. In this case, the signal $f_2$ is transmitted on leads 52 and 54 to lamp 12. At station B, the signals $f_2$ are picked up by photocells 33 and 34. The phase of the signals $f_2$, picked up by one of photocells 33 or 34, is reversed, and the two signals are combined algebraically. The resultant output signal of a frequency $f_2$ has a phase which is determined by the relative magnitude of the signals picked up by the photocells 33 and 34. The resultant signals are then transmitted back to station A. They are picked up by the main communication photocell 14 and transmitted along leads 56 and 58 back to the alinement receiver 42. Signals are then applied on leads 60 to motor 36 to rotate the lamp and photocell assembly so that the beam from lamp 12 provides light of equal strength on photocells 33 and 34 at station B.

Figure 2 shows a photocell and lamp beam pattern. In this regard, the four photocells shown in Figure 2 are designated 31 through 34 to correspond with those at station B in Figure 1. The circular lines 62 of Figure 2 are designated "isolux" lines and indicate points of equal light intensities.

In Figure 3, the isolux lines 62' are located off-center with respect to the four photocell pickup elements 31 through 34. By algebraically subtracting the light picked up in photocell pair 31—32 and photocell pair 33—34, two vectors may be obtained which locate the center of the light beam. This vector summation is shown in Figure 4. The numerical designations employed in Figure 4 identify the photocells 31 through 34 in terms of the numbers 1 through 4, respectively. In the particular system which will be described in some detail below, only the polarity of the displacement and not its magnitude is determined. It is evident from the vector diagram of Figure 4, however, that the magnitude of the displacement would also be detected to provide a differential rebalancing rate for the servo loop, if this were considered necessary.

Figure 5:
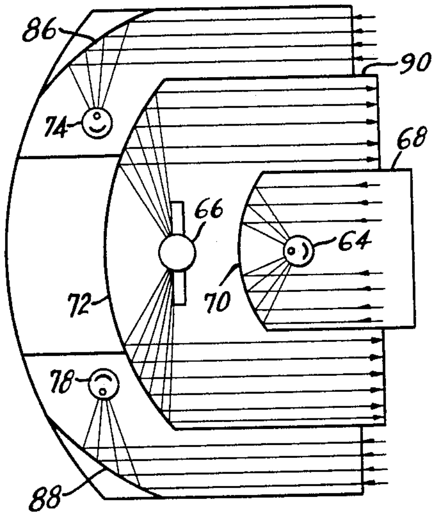
Figures 5 and 6 represent one suitable construction for a lamp and photocell assembly, which could be used in the system of Figure 1.
Figure 6:
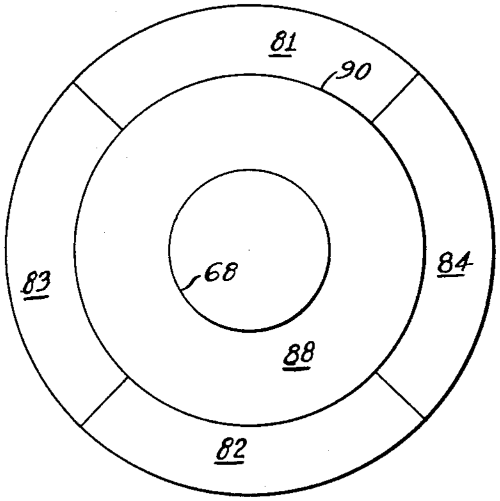

Figures 5 and 6 show a mechanical mounting arrangement for a set of five photocells and a transmitting lamp which is somewhat more sophisticated than the models shown schematically in Figure 1. In Figure 5, photocell 64 is located near the center of the assembly. An arc lamp 66 is also mounted substantially on the axis of the assembly. The photocell 64 is protected from receiving signals from the arc lamp 66 by the shielding wall 68. Mirror surfaces 70 and 72 serve to focus the incoming light on the photocell, and to collimate the outgoing light from the lamp, respectively. Four additional photocells are included in the assembly of Figures 5 and 6 to take the place of the co-ordinate alinement photocells 21 through 24 and 31 through 34 of Figure 1. Two of these photocells 74 and 78 are shown in Figure 5. As shown in Figure 6, the four peripheral photocells receive illumination from the areas designated 81 through 84. Light incident on the area 81 is reflected by the mirror surface 86 to the photocell 74. Similarly, light received at area 82 is reflected from the mirror surface 88 to the photocell 78. The light transmitted from the area 88 is shielded from the four outer photocells by the partition member 90.

Figure 7:
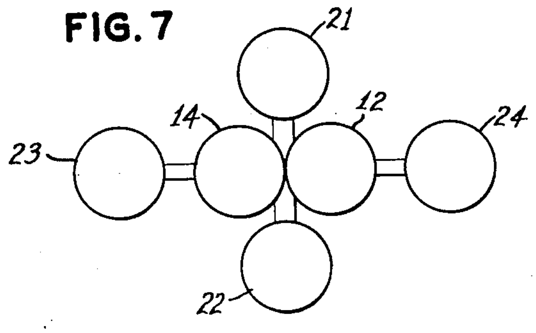
Figure 7 is a diagram showing a front view of the lamp and photocell assemblies employed in Figure 1.

Figure 7 is a front view of the lamp and photocell assemblies of Figure 1. A comparison of Figure 7 with the corresponding showing in Figure 6 reveals the misalinement produced by the assembly of Figure 7, as contrasted with the preferred coaxial arrangement of Figures 5 and 6.

Figure 8:
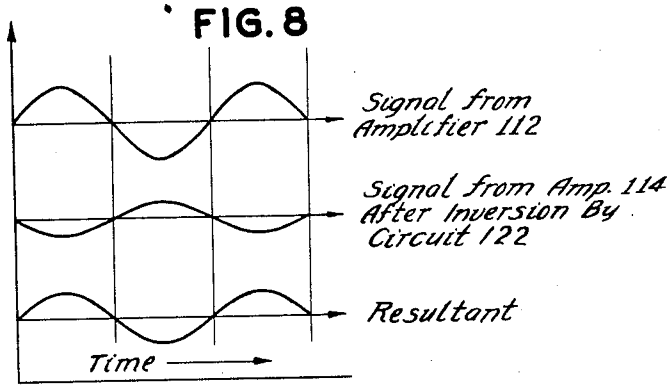
Figure 8 shows a set of plots indicating the mode of operation of the circuits of Figures 1 and 9.
Figure 9A:
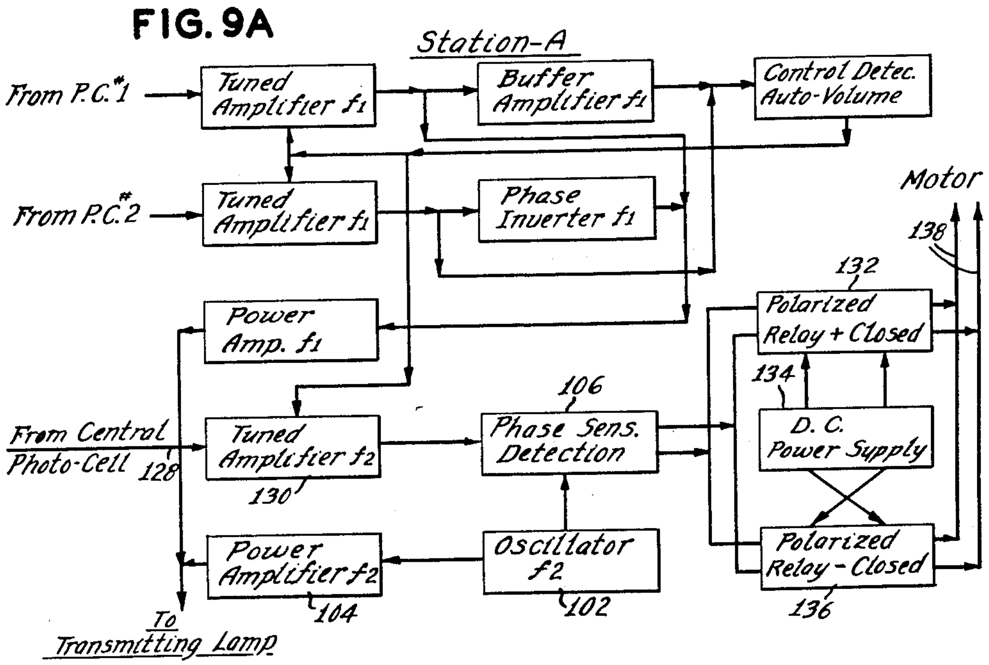
Figures 9A and 9B together constitute a detailed block diagram of a portion of the circuitry included in the system of Figure 1.
Figure 9B:
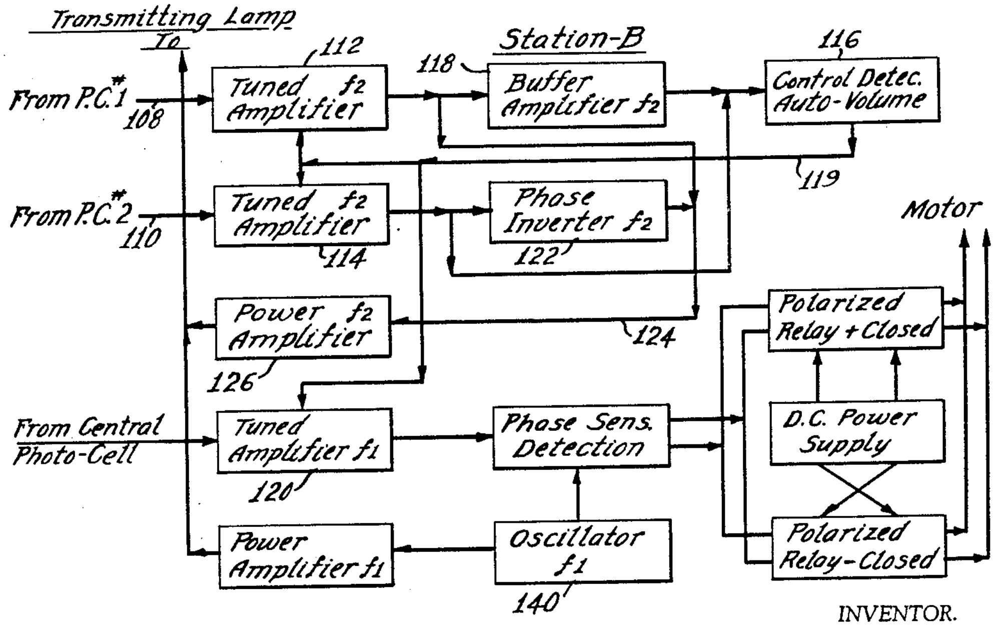

Figure 8 will now be considered in combination with Figures 9A and 9B to bring out the detailed mode of operation of one particular illustrative embodiment of the invention. In Figures 9A and 9B, circuitry is disclosed for rotating the photocell assemblies about one axis. Substantially duplicate facilities are required for rotation about the other axis. The general nature of such additional facilities will be described below, and such facilities are included in the circuitry 42 and 48 shown in Figure 1.

In Figure 9A, the oscillator 102 at station A generates a frequency $f_2$. This frequency $f_2$ is coupled by the power amplifier 104 to the transmitting lamp of station A. It is also coupled to the phase sensitive detection circuit 106 as discussed below. At station B, as shown in Figure 9B, signals from a pair of opposed co-ordinate photocells are applied to leads 108 and 110. The tuned amplifiers 112 and 114 are coupled respectively to leads 108 and 110. These amplifiers are both tuned to the frequency $f_2$, generated by oscillator 102 at station A. The amplifier 114 has its output coupled to the automatic volume control detector 116. The amplifier 112 is also coupled to the A.V.C. detector 116 through the buffer amplifier 118, which provides no additional gain. Special care is taken by using heavy negative feedback applied on lead 119 to make the amplification of both amplifiers 112 and 114 equal and constant at different input levels. Negative feedback is also applied from lead 119 to the tuned amplifier 120, which is employed in another circuit. Amplified signals from the tuned amplifier 114 are inverted in circuit 122 and combined with signals from amplifier 112 on lead 124.

Figure 8 indicates the nature of the combination of signals from tuned amplifiers 112 and 114. In Figure 8, the signal from amplifier 112 is shown in the upper plot, and the inverted signal from amplifier 114 and inverter 124 is shown in the second plot. As shown in Figure 8, the amplitude of signals applied to amplifier 112 was significantly greater than those applied to amplifier 114. This is, of course, a result of a displacement of the light beam of station A from its central position. The third and lowermost plot is the algebraic sum of the upper two plots. It has a phase corresponding to that of the greater signal, in this case, the signal from amplifier 112. The signals on lead 124 are applied to the power amplifier 126, which is coupled to the transmitting lamp for station B. At station A, the signals are received on the central photocell and coupled by lead 128 to the tuned amplifier 130. The phase of the signals at the output of amplifier 130 is detected by circuit 106, which utilizes reference signals from oscillator 102 to produce different output signals in accordance with the phase of the received signals. The circuitry designated 132, 134 and 136 in Figure 9A is employed to provide opposite signals to the motor control leads 138 in accordance with the output signals from the phase detector 106. This circuitry includes the direct current power supply 134, and suitable polarized relay circuitry designated 132 and 136 in Figure 9A. Depending on the phase of the signals received by amplifier 130, the motor coupled to leads 138 is operated to turn in one direction or the other. The motor operation continues until the lamp of station A is rotated into alinement with the remote lamp and photocell apparatus. At this time, the signals received on leads 108 and 110 at station B are equal. The signals on lead 124 cancel out, and the motor is no longer energized.

In the foregoing paragraphs, the technique for orienting the lamp at station A in accordance with the relative magnitude of signals picked up by photocells at station B has been discussed. The circuits of Figures 9A and 9B also include the necessary components for rotating the lamp at station B in accordance with signals picked up at station A. The required circuitry at stations A and B is substantially the same as that described above. The only difference between the two circuits lies in the frequency of oscillator 140 at station B and the corresponding frequency of the tuned circuits at stations A and B, which handle the signal. It may also be noted that rotation in a single plane is accomplished by the circuits included in Figures 9A and 9B. In the circuit of Figure 1, however, rotation about both horizontal and vertical axes is disclosed. With reference to Figure 1, the circuits 42 and 48 include the circuitry shown at Figures 9A and 9B, respectively, and include comparable additional equipment for rotating the lamp and photocell assemblies about a second axis. This additional equipment includes another oscillator tuned to a different frequency at both station A and station B. In addition, equipment approximately corresponding to that shown in Figures 9A and 9B is required to accommodate the extra equipment needed for rotation of the lamp and photocell apparatus in the second plane.

In accordance with the system described above for the automatic orientation of the two lamp assemblies at the two stations, four control frequencies are required. The numerical values of the four frequencies depends on the desired response time of the complete system. For slow moving vehicles, like ships, the response time can be less while on fast and abruptly moving vehicles, the response time must be more rapid. For ship to ship communication, a response time of about 0.1 second is sufficient. To transmit the required step function, a bandwidth of approximately 15 cycles is necessary. Taking reasonable design factors into consideration, the lowest center frequency would be about 20 or 30 cycles per second. The total bandwidth for all four channels with some spacing between channels would be about 100 to 150 cycles per second. This band of control frequencies can be positioned with respect to the communication band or bands in accordance with engineering requirements. With a multiple band communication system the control band could be located between two of the communication bands. Alternatively, it could be located above or below the entire range of communication frequencies.

It is to be understood that other signaling arrangements may be employed instead of that disclosed hereinabove. For example, if it is considered that too much channel space is employed by transmitting signals back and forth over the communication channel, the following arrangements could be used to eliminate two control channels. At each station, pulse trains could be developed having equal on and off periods when the beam from the remote station is properly oriented. Upon the deviation of the beam from its central position, however, the proportion of on and off time could be shifted; thus, a shift to the left could produce signals which are on for three-quarters of each cycle and off for one-quarter of each cycle, whereas a shift to the right would produce signals which are off for three-quarters of each cycle and on for one-quarter of a cycle. In this manner, control of the remote lamps could be effected using only two instead of four channels.

It is to be understood that the above described arrangements are illustrative of the application of the principles of the invention. Numerous other arrangements may be devised by those skilled in the art without departing from the spirit and scope of the invention.

What is claimed is:

1. In a system for orienting the transmitting and receiving apparatus of a two-way light communication system, first and second stations each including a directional light source, a photocell, means for generating signals indicating light intensity at at least two spaced points with respect to said photocell, means for combining said signals to provide signals representing the orientation of the remote light source, means for varying the intensity of the light source in accordance with the orientation signal information, and means for adjusting the position of each of the directional light sources in accordance with the orientation signal information transmitted by the other light source.

2. In a light communication system, a first directional lamp, a second lamp, a photocell associated with said second lamp, means for generating signals indicating the light intensity derived from said first lamp at at least two spaced points with respect to said photocell, means for combining said signals to provide signals representing the orientation of said first light source, means for modulating the light intensity of said second lamp in accordance with the orientation signal information, and means for adjusting the position of said first lamp in accordance with the modulation signals transmitted by said second lamp.

3. In a two-way light communication system, a first station including a directional lamp; and a second station including a second lamp, light sensing means for generating signals indicating relative intensity of received light at different points with respect to the light sensing means, and circuitry for modulating the second lamp in accordance with the generated signals; and the first station further including apparatus for reorienting the directional lamp in accordance with the modulated signals transmitted by the second lamp.

4. A combination as defined in claim 3 wherein the light sensing means includes four spaced photocells.

5. In a two-way light communication system, a first station including a directional lamp; and a second station including a second lamp, light sensing means for generating signals indicating relative intensity of received light at different points with respect to the light sensing means, and circuitry for modulating the second lamp in accordance with the generated signals; the first station further including apparatus for reorienting the directional lamp in accordance with the modulated signals transmitted by the second lamp; means associated with said first station for transmitting a control signal frequency from said first station to said second station via the directional lamp; and means associated with said modulation circuitry at said second station for selectively modifying the phase of the transmitted signals in accordance with the signals representing light intensity and for retransmitting the modified signals to the first station.

References Cited in the file of this patent

UNITED STATES PATENTS

| | | |
|---|---|---|
| 2,345,445 | Atwood | Mar. 28, 1944 |
| 2,377,589 | Sutcliffe | June 5, 1945 |